Nov. 15, 1966  TOSHIO HANAWA ET AL  3,285,573
MOTOR BLOCK
Filed Aug. 26, 1963  4 Sheets-Sheet 1

INVENTORS.
TOSHIO HANAWA
TAKESHI TOKUNAGA
YASUHIRO IWATA
BY
ATTORNEYS.

INVENTORS
TOSHIO HANAWA
TAKESHI TOKUNAGA
YASUHIRO IWATA
BY: Paul M. Craig, Jr.
ATTORNEY 3,285,573
MOTOR BLOCK
Toshio Hanawa and Takeshi Tokunaga, Hitachi-shi, and Yasuhiro Iwata, Mishima-shi, Japan, assignors to Hitachi, Ltd., Tokyo, Japan, a corporation of Japan
Filed Aug. 26, 1963, Ser. No. 304,343
Claims priority, application Japan, Aug. 29, 1962, 37/36,087, 37/36,088
4 Claims. (Cl. 254—168)

In general a loading machine called a motor block is used to convey goods of weight under several tons. The motor block comprises a driving motor which is made to rotate in one direction or reversely through control from below, a reduction gear device through which a sprocket is connected to the motor and a link chain having a lifting hook fastened to one end is engaged with the sprocket for vertical movement. As such motor blocks hitherto employed had a cast body frame and a cast motor frame, they were large in size, heavy in weight, expensive in price, defective in structure and furthermore difficult to install.

In the motor block of this invention frames made of steel plate are used in order to make it free from the above-mentioned defects, in other words small in size, light in weight and low in price. The objects of the invention are enumerated below.

A principal object is to simplify the structure of the gear case and the motor frame and to make the size and weight smaller by making parallel basic plates of steel plate support the load to avoid application of excessive force upon the gear case and the motor frame.

A second object is the most simple and efficient fixing of a driving motor to the parallel basic plates by fitting a bearing in one of the basic plates and by providing on the other basic plate a hole through which the motor is inserted and fixed to the opposite basic plate with the support of the bearing.

A third object is to efficiently support the ball bearings of the reduction gear device by the thin gear case by forming fixed holes for the ball bearings at the cross points of several intersecting ribs formed on the surface of the gear case.

A fourth object is to make the motor block smaller in size and to make it easy to assemble or disassemble by using an efficient disc brake to stop movement of load.

And a fifth object is to prevent the motor from being made to rotate at high speed owing to the load in case of disc brake troubles and to prevent the goods from falling at high acceleration by fixing to the end part of the motor shaft a centrifugal brake moving segment for which the circumferential surface of the hollowed end bracket of the driving motor serves as a braking surface.

Figure 1:
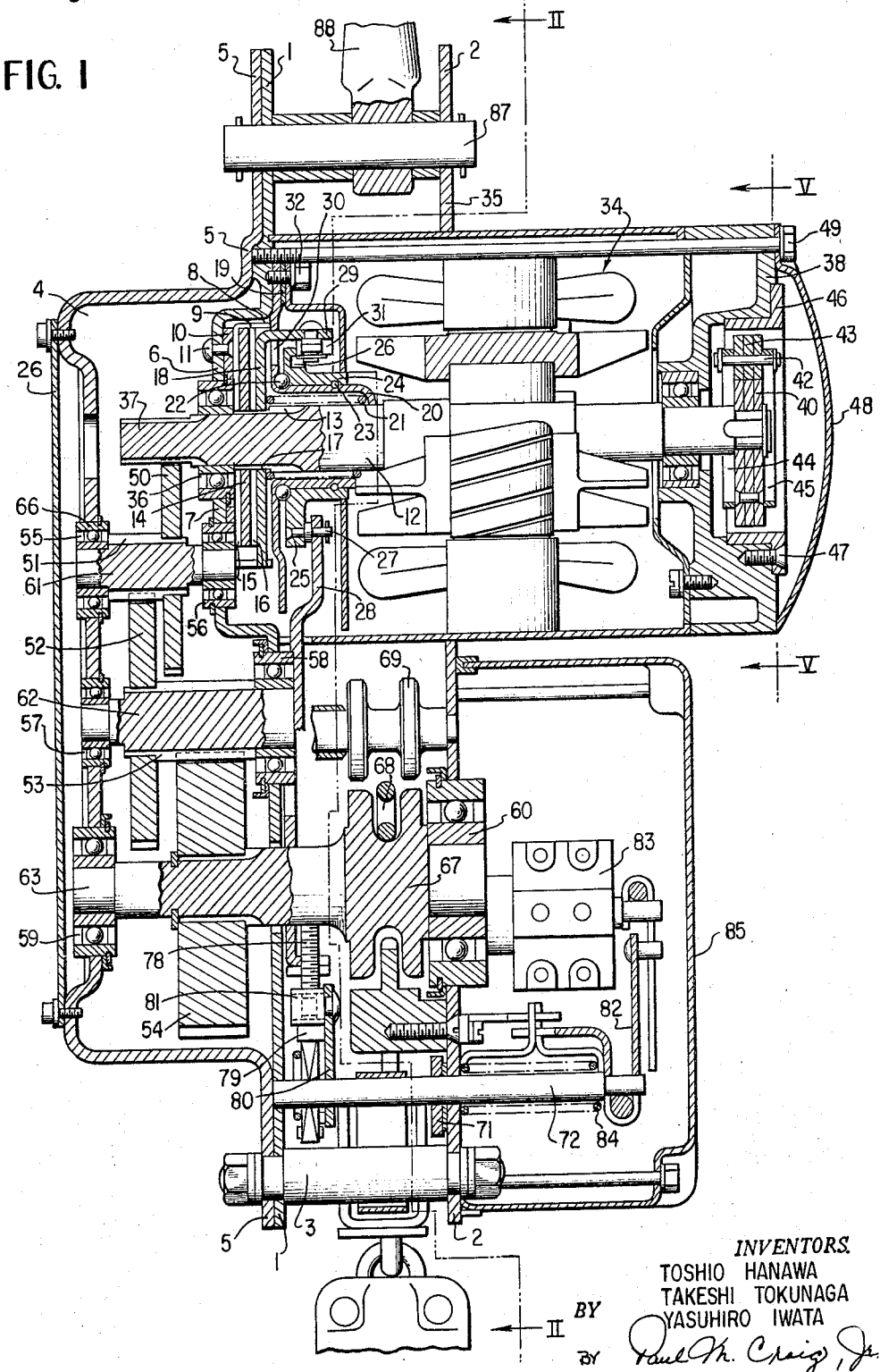
Figure 3:
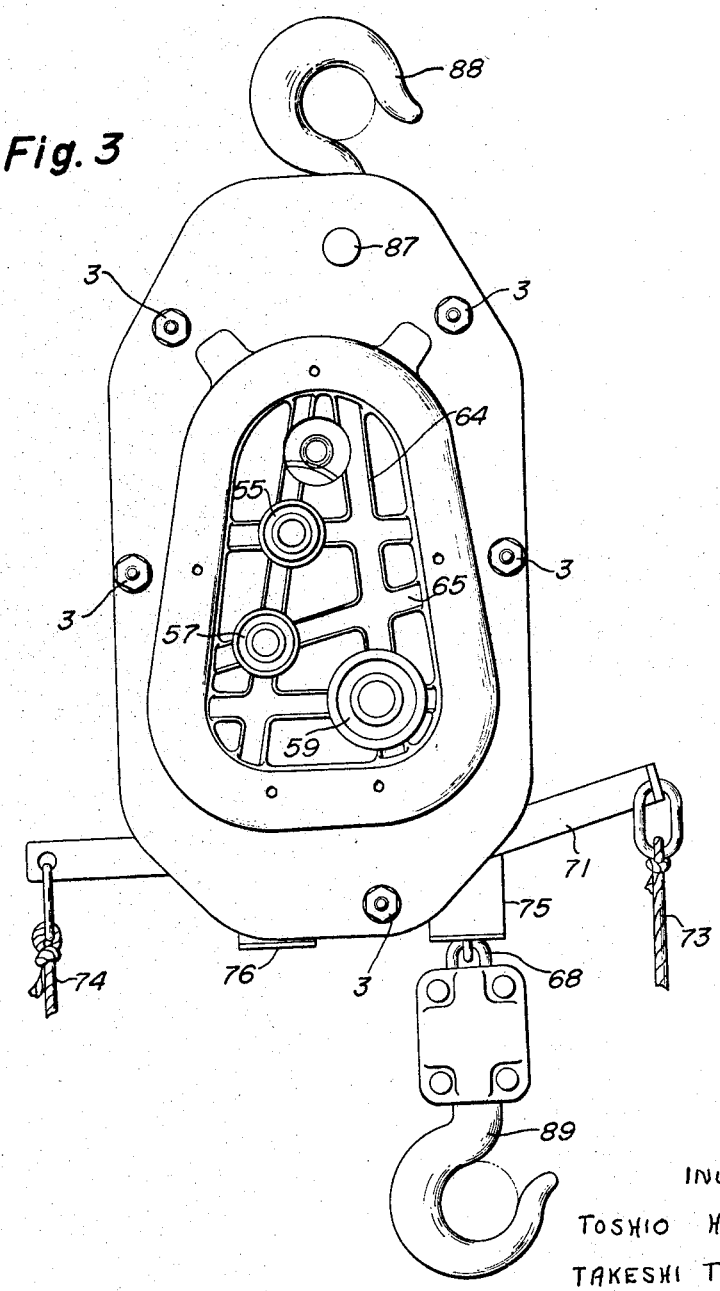
Figure 4:
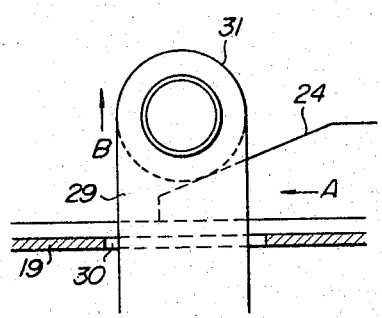
Figure 5:
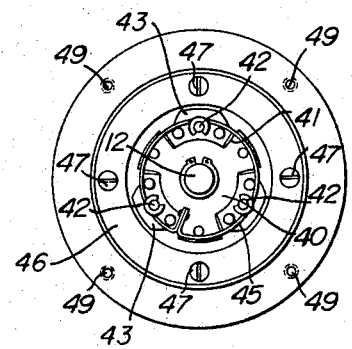
Figure 6:
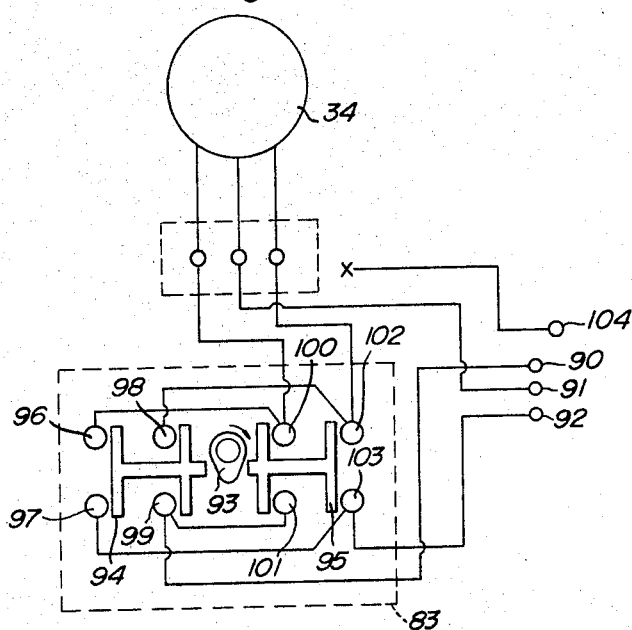

Further description is given with reference to the drawings showing an example of a motor block to perform this invention. FIGURE 1 is a longitudinal side view of a motor block, FIGURE 2 shows a section of the part II—II in FIGURE 1, FIGURE 3 is a front view of the motor block with a bearing cover off, FIGURE 4 is a section of the part IV—IV in FIGURE 2, FIGURE 5 shows a section of the part V—V in FIGURE 1 and FIGURE 6 is a wiring diagram.

Figure 2:
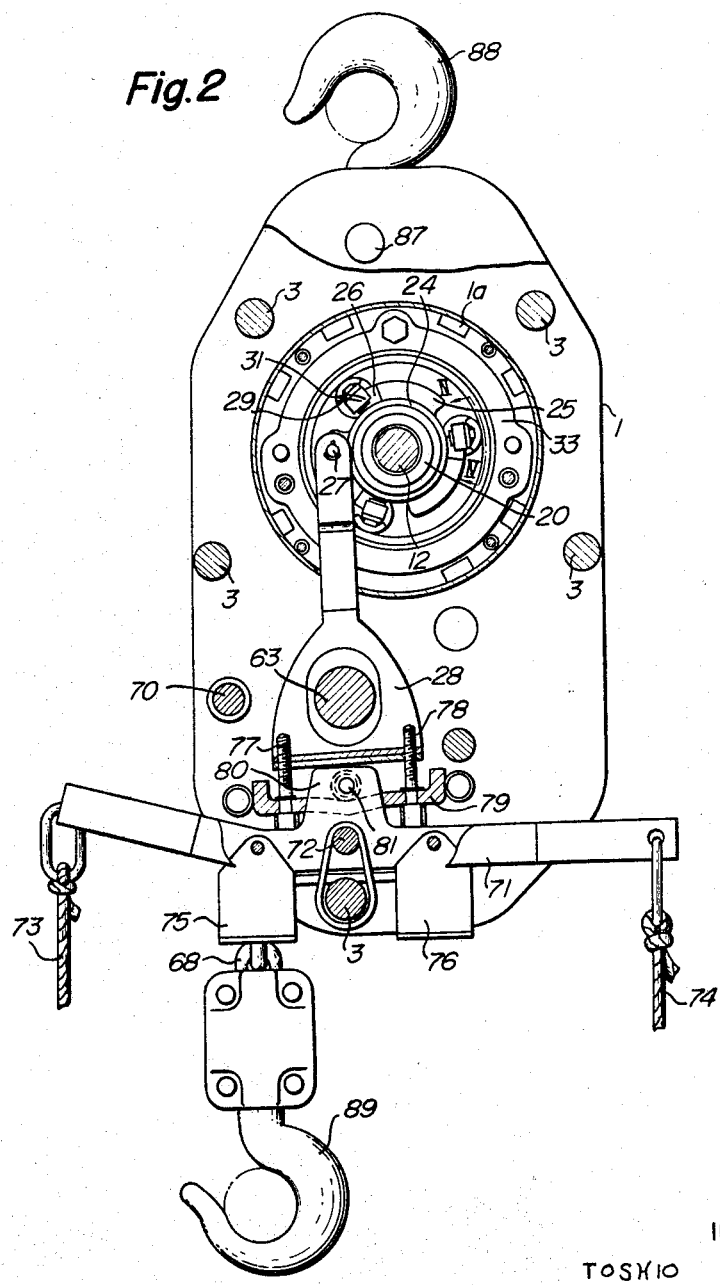

Referring to FIGURE 1 and 2, parallel basic plates 1 and 2 made of steel plate are fixed with suitable space between them by means of spacer bolts 3, and on the outer side of the basic plate 1 a steel plate gear case 5 with a protruding from 4 is fixed also by means of the spacer bolts 3. The upper part of the parallel basic plate 1 facing the protruding from 4 of the gear case 5 bulges out almost in the shape of a cylinder and protrudes into the protruding portion 4 to form a brake fixing portion 6, and a bearing hole 7 is bored in the center of the fixing portion 6. To the inside surface of the fixing portion 6 a brake collar 8 is fitted and a brake fixing plate 10 engaged with spline 9 on the inside surface of the brake collar 8 is fixed to one side of the fixing element 6 by means of rivets 11. At the back of the brake fixing plate 10 there is placed a rotary disc 14 engaged with the spline 13 on a motor shaft 12 by means of suitable projections. On both faces of the rotary disc 14 brake linings 15 and 16 are pasted. Further, at the back of the rotary disc 14 there is placed a moving plate 18 having a hole in the center and projections on the circumference engaged with the said spline 9 of the brake collar 8. The back of the moving plate 18 is enclosed by a supporting plate 19. The central part of the supporting plate 19 forms a cylinder 20 which is a little larger in diameter than the motor shaft 12 and protrudes backwards. A coil spring 21 preloaded and kept in the cylinder 20 presses the said moving plate 18 forwards (against the brake fixing plate). Around the cylinder 20 an operating ring 24 is fitted to freely rotate and move with steel balls 22 and 23. The operating ring 24 has a flange 25 with a plane inclining towards the rotating direction of the ring. Further, the operating ring is made to rotate by pulling an operating level 28 fixed by means of a pin 27 set to the flange 25. The said moving plate 18 is bent to form an arm 29, which extends outwards through the hole 30 of the supporting plate. A roller 31 fixed to the end of the arm 29 faces the inclined plane 26. An enlarged section of the part is shown in FIGURE 4. This disc brake is covered with a brake cover 33 fixed to the parallel basic plate 1 together with the suporting plate 19 by means of a bolt 32. The other parallel basic plate 2 facing the brake is apertured so that the driving motor 34 may be inserted through the hole and fitted on a circle of projections 1a made around the brake device on the parallel basic plate 1. The motor shaft 12 goes through the cylinder 20 formed by the brake supporting plate 19, guides the coil spring 21, passes through the moving plate 18, is connected with the projections of the rotary disc 14 by means of its spline, is supported by the ball bearing 36 fitted in the bearing hole 7 of the parallel basic plate 1 and is shaped into a gear on the one end protruding into the protruding portion 4 of the gear case 5. On the other side of the driving motor 34 an end bracket 38 shaped inwardly is fitted, and the other end of the motor shaft 12 supported by a ball bearing 39 fitted in the center of the end bracket 38 protrudes into the hollow formed thereby. To the end part of the motor shaft 12 a rotary disc 40 is fitted by means of a key, and on the circumference of the rotary disc three notches 41 are formed. And in the notches 41 centrifugal brake segments 43, each with a pin protruding to both sides, are fitted and are pushed towards the motor shaft 12 by ring springs 44 and 45 wound around the pins 42 and over the rotary disc. Element 46 is a brake lining fitted in the hollow of the end bracket 38 and fixed to the end bracket 38 by means of a set screw 47 so as not to rotate. Element 48 is a brake cover fixed to the parallel basic plate 1 together with the end bracket 38 and the motor body by means of through bolts 49. A section of the safety brake V—V is shown in FIGURE 5.

In the protruding portion 4 of the gear case 5, stated previously, there are kept three sets of reduction gear 37–50, 51–52 and 53–54. The elements 55, 56, 57, 58, 59, and 60 are ball bearings respectively fitted in the gear case 5 and the parallel basic plate 2 to support rotary shafts 61, 62 and 63 of the said reduction gear device. On the surface of the gear case, as shown in FIGURE 3, longitudinal and transversal ribs 64 and 65 crossing each other are formed. In a bearing hole 66 formed at the intersection of the ribs a ball bearing 55 is fitted and fixed. The element 67 is a sprocket fitted to a part of the final rotary shaft 63 between the parallel basic plates 1 and 2. And a link chain 68 is engaged with the sprocket 67. Around the sprocket 67 there are fixed chain guides 69 and 70 to keep the link chain 68 and the sprocket 67 properly engaged. The element 71 is a switch bar which can rotate around a switch shaft 72 and has pulls 73 and 74 fastened at both end. Elements 75 and 76 are chain guides fixed on both sides of the switch shaft 72, almost U shaped and each with a cross shaped hole in the bottom to let the link chain pass through. The lower part of the previously stated operating lever 28 for the disc brake is bended to shape, a L letter to which a link bar 79 is fixed by means of set screws 77 and 78. The link bar 79 has a downward curve in the central part, with which a roller 81 in the central projection 80 of the switch lever 71 is engaged. Element 82 is an operating arm fixed to the end of the switch shaft 72 which turns with the rotation of the switch shaft 72 and controls a motor control switch 83. Element 84 is a return spring which provides the switch shaft 72 with force to push back the switch lever to its position by releasing the pulls 73 and 74. Element 85 is a switch cover covering the motor control switch 83 and others, while 86 is a bearing cover covering the end face of the said gear case 5. The motor block, thus constructed, is set in a work shop by means of a hook 88 fixed to the upped end of the parallel basic plate 1 and 2 and works to lift goods with a hook 89 fastened to the lower end of the link chain.

Next, the electrical wiring will be explained in accordance with FIGURE 6. The driving motor 34 is connected with power source terminals 90, 91 and 92 through the motor control switch 83, which changes over the two phase contacts to make the driving motor rotate in one direction or in the other by making or breaking contact between fixed contacts 96–97, 98–99, 100–101 and 102–103 with moving segments 94 and 95 operated by a cam 93. 104 is an earth terminal.

When we use the motor block, we should first hang it with the hook 88 from the ceiling of the work shop, let the pulls 73 and 74 down to the floor and connect the power source terminals 90, 91 and 92 and the earth terminal 104 respectively with supply wire and earth wire. Now the motor block has been set up, but it is still out of operation, because neither of the pulls 73 or 74 has been pulled. When we hang goods on the hook 89 to lift it and pull the pull 73, the cam 93 rotates in the direction of the arrow mark in FIGURE 6 and pushes the moving segment 95 to make contact between the fixed contacts 100–101 and 102–103, and thereby the driving motor 34 is supplied with electric power to rotate in one direction. At the same time the roller 81 in the projection 80 of the switch lever 71 moves around the switch shaft 72 and pushes the link bar 79 downwards. The link bar 79, as going down, makes the operating lever 28 move downwards through link screws 77 and 78 and makes the operating ring 24 turn counterclockwise as shown in FIGURE 2. The turning direction is expressed by arrow mark A in FIGURE 4. The roller 31 and the arm 29 move in the direction of arrow mark B, and the moving plate 18 moves to the right against the force of the coil spring 21, as shown in FIGURE 1, leaving the rotary disc 14. Accordingly the braking effort acting on the motor shaft 12 is lost, and the driving motor 34 rotates in one direction to make the sprocket rotate and lifts the goods by the link chain 68. In this case, as the rotating speed of the driving motor 34 does not rise so high because of being controlled by the load, the centrifugal brake device need not work, and the motor block operates properly. To stop the motor block, we only need to let the pull 73 go. Then the switch lever 71 returns to its position through the force of the return spring 84 and the coil spring 21, and the rotary disc 14 is pressed between the brake fixing plate 10 and the moving plate 18 to give the motor shaft 12 braking effort and stop it.

In case the pull 73 is still being pulled after the hook 89 reaches its lifting limit during lifting work, the driving motor continues to rotate. If the driving motor goes on rotating under such a condition, the hook may collide against the body and do damage to it or let the goods fall. In that case, however, the hook 89 collides against the chain guide 75 and pushes it up, accordingly to push back the switch lever 71 against the pulling force of the pull 73. Consequently, the cam 93 returns to its place and breaks the circuit, and thereby the driving motor 34 loses torque and at the same time the disc brake works to stop the driving motor 34.

Further, when we want to lower the goods, we need to pull the pull 74. Then, the cam 93 turns in reverse direction of the arrow in FIGURE 6 to push the moving segment 94 towards the fixed contacts 96–97 and 98–99 and makes contact between them. As the result the driving motor is inversely connected with the supply wire and rotates in reverse. Accordingly the link chain 68 runs out of the sprocket 67 to lower the goods.

In case the wire comes off or the power gives out, the driving motor 34 loses torque, however, but it may be made to rotate at very high speed by the load of the goods, and the goods may fall at high acceleration. In such a case, the centrifugal segments of the safety brake fixed to the shaft end of the driving motor dash off owing to the centrifugal force against the force of the ring springs 44 and 45, and contact with the brake lining 46. The friction resistance gives braking force to the motor shaft. Therefore, we can carry on loading work without fear that the goods may fall down in case of electricity failure.

The motor block of this invention with above stated operation enables us to safely carry out loading work and its simple structure decreases troubles and makes assembling, disassembling or repairing easy.

What is claimed is:

1. A motor block for lifting goods by means of a link chain operated by a sprocket means connected to a driving motor comprising a chain, sprocket means for engaging said chain, and a driving motor, first and second base plates secured to one another in closely spaced parallel relationship, said second base plate having an aperture therein, said driving motor being securely mounted on said first base plate and having a housing portion extending through said aperture in said second base plate, gear case means including a reduction gear device secured to said first base plate in driven engagement with said driving motor, a rotatable shaft mounted between said first and second base plates and connected to said reduction gear device so as to be driven by said motor, said sprocket means being mounted on said rotatable shaft, and actuating means for selectively energizing said driving motor, bearing means mounted in said first base plate, said driving motor having a drive shaft supported within said bearing means with one end of said housing means being fastened to said first base plate and the other end thereof extending through said aperture in said second base plate, said gear case means further including support means for said reduction gear device including a plurality of intersecting ribs, said gear reduction device including bearing means mounted on said intersecting ribs, disc brake means for normally preventing rotation of said drive shaft of said driving motor, said disc brake means being disengaged only by said actuating means, said disc brake means including disc means connected to the drive shaft of said driving motor for rotation therewith, a movable plate and a brake collar engaged by said movable plate, a stationary brake plate located on one side of said disc means opposite said movable plate, a rotatable operating ring in engagement with said movable plate for pressing said disc means against said stationary brake plate with braking force upon rotation thereof, said actuating means including lever means for rotating said operating ring.

2. A motor block for lifting goods by means of a link chain operated by a sprocket means connected to a driving motor comprising a chain, sprocket means for engaging said chain, and a driving motor, first and second base plates secured to one another in closely spaced parallel relationship, said second base plate having an aperture therein, said driving motor being securely mounted on said first base plate and having a housing portion extending through said aperture in said second base plate, gear case means including a reduction gear device secured to said first base plate in driven engagement with said driving motor, a rotatable shaft mounted between said first and second base plates and connected to said reduction gear device so as to be driven by said motor, said sprocket means being mounted on said rotatable shaft, and actuating means for selectively energizing said driving motor, bearing means mounted in said first base plate, said driving motor having a drive shaft supported within said bearing means with one end of said housing means being fastened to said first base plate and the other end thereof extending through said aperture in said second base plate, said gear case means further including support means for said reduction gear device including a plurality of intersecting ribs, said gear reduction device including a bearing means mounted on said intersecting ribs, disc brake means for normally preventing rotation of said drive shaft of said driving motor, said disc brake means being disengaged only by said actuating means, centrifugal brake means for automatically locking said drive shaft of said driving motor against rotation upon reaching a predetermined rotational speed, said disc brake means including disc means connected to the drive shaft of said driving motor for rotation therewith, a movable plate and a brake collar engaged by said movable plate, a stationary brake plate located on one side of said disc means opposite said movable plate, a rotatable operating ring in engagement with said movable plate for pressing said disc means against said stationary brake plate with braking force upon rotation thereof, said actuating means including lever means for rotating said operating ring, said centrifugal brake means including an end bracket in the end of said motor housing extending through said aperture, said end bracket having a recess therein, a rotary disc means fixed to one end of said drive shaft supported by said end bracket, centrifugal segment means mounted on said disc means for rotation into and out of engagement with said end bracket in dependence upon the rotational speed of said drive shaft.

3. A motor block for lifting goods by means of a link chain operated by a sprocket means connected to a driving motor comprising a chain, sprocket means for engaging said chain, and a driving motor, first and second base plates secured to one another in closely spaced parallel relationship, said second base plate having an aperture therein, said driving motor being securely mounted on said first base plate and having a housing portion extending through said aperture in said second base plate, gear case means including a reduction gear device secured to said first base plate in driven engagement with said driving motor, a rotatable shaft mounted between said first and second base plates and connected to said reduction gear device so as to be driven by said motor, said sprocket means being mounted on said rotatable shaft, and actuating means for selectively energizing said driving motor, bearing means mounted in said first base plate, said driving motor having a drive shaft supported within said bearing means with one end of said housing means being fastened to said first base plate and the other end thereof extending through said aperture in said second base plate, centrifugal brake means for automatically locking said drive shaft of said driving motor against rotation upon reaching a predetermined rotational speed, said disc brake means including disc means connected to the drive shaft of said driving motor for rotation therewith, a movable plate and a brake collar engaged by said movable plate, a stationary brake plate located on one side of said disc means opposite said movable plate, a rotatable operating ring in engagement with said movable plate for pressing said disc means against said stationary brake plate with braking force upon rotation thereof, said actuating means including lever means for rotating said operating ring.

4. A motor block for lifting goods by means of a link chain operated by a sprocket means connected to a driving motor comprising a chain, sprocket means for engaging said chain, and a driving motor, means for suspending said motor block and means engaging with goods to be lifted, first and second base plates secured to one another in closely spaced parallel relationship providing a rigid support structure of high strength extending from a means for suspending said motor block at one end of said support structure to a means engaging with goods to be lifted at the other end of said support structure, said second base plate having an aperture therein, said driving motor being securely mounted on said first base plate and having a housing portion extending through said aperture in said second base plate, the distance between said first and second base plates being less than one half the length of said driving motor, gear case means including a reduction gear device secured to said first base plate in driven engagement with said driving motor, a rotatable shaft mounted between said first and second base plates and connected to said reduction gear device so as to be driven by said motor, said sprocket means being mounted on said rotatable shaft, and actuating means for selectively energizing said driving motor, said gear case means further including support means for said reduction gear device including a plurality of intersecting ribs, said gear reduction device including bearing means mounted on said intersecting ribs.

References Cited by the Examiner

UNITED STATES PATENTS

| 1,455,369 | 5/1923 | Valentine. | |
| 1,670,734 | 5/1928 | Moore | 254—168 |
| 1,847,764 | 3/1932 | Kindle | 188—185 |
| 1,898,753 | 2/1933 | Wente | 254—168 |
| 2,221,835 | 11/1940 | Harkrader | 254—185 |
| 2,371,352 | 3/1945 | Parker | 254—168 |

(Other references on following page)

UNITED STATES PATENTS

| | | | |
|---|---|---|---|
| 2,406,156 | 8/1946 | Nardone | 188—185 |
| 2,435,754 | 2/1948 | Roth | 188—77 |
| 2,496,754 | 2/1950 | Schramm | 254—168 |
| 2,926,542 | 3/1960 | Schmitten | 74—421 |
| 2,936,915 | 5/1960 | Maish | 254—186 |
| 2,949,979 | 8/1960 | Carroll | 188—77 |
| 3,073,176 | 1/1963 | Daugirdas | 74—421 |

FOREIGN PATENTS 536,395   1/1957   Canada.

EVON C. BLUNK, *Primary Examiner.*

SAMUEL F. COLEMAN, *Examiner.*

H. C. HORNSBY, *Assistant Examiner.*